(12) United States Patent
Taylor

(10) Patent No.: US 6,371,068 B2
(45) Date of Patent: Apr. 16, 2002

(54) AIR INTAKE FOR INTERNAL COMBUSTION ENGINE

(76) Inventor: G. Brandt Taylor, 36 Barnes Hill Rd., Berlin, MA (US) 01503

( * ) Notice: Subject to any disclaimer, the term of this patent is extended or adjusted under 35 U.S.C. 154(b) by 0 days.

(21) Appl. No.: 09/765,736

(22) Filed: Jan. 22, 2001

Related U.S. Application Data

(60) Provisional application No. 60/177,771, filed on Jan. 24, 2000.

(51) Int. Cl.$^7$ .............................................. F02M 35/10
(52) U.S. Cl. ................................................ 123/184.21
(58) Field of Search ....................... 123/184.21, 184.61, 123/590

(56) References Cited

U.S. PATENT DOCUMENTS

| | | |
|---|---|---|
| 1,613,995 A | 1/1927 | Grove |
| 2,640,470 A | 6/1953 | Haltenberger |
| 2,920,613 A | 1/1960 | Vogel et al. |
| 2,920,648 A | 1/1960 | Sheffer |
| 2,946,345 A | 7/1960 | Weltmer |
| 3,008,453 A | 11/1961 | Kahn et al. |
| 3,408,992 A | 11/1968 | von Seggern et al. |
| 3,875,918 A * | 4/1975 | Loynd .................... 123/184.57 |
| 4,066,720 A * | 1/1978 | Carter .................... 123/184.21 |
| 4,210,107 A * | 7/1980 | Shaffer .................. 123/184.34 |
| 4,308,829 A | 1/1982 | Yamada et al. |
| 4,308,830 A | 1/1982 | Yamada et al. |
| 4,318,372 A | 3/1982 | Bracken, Jr. et al. |
| 4,413,598 A | 11/1983 | Tsutsumi |
| 4,415,507 A * | 11/1983 | Voliva ........................ 123/590 |
| 4,424,777 A | 1/1984 | Klomp |
| 4,492,212 A * | 1/1985 | Dooley ........................ 123/590 |
| 6,006,721 A | 12/1999 | Shannon et al. |
| 6,014,987 A | 1/2000 | List et al. |
| 6,039,029 A | 3/2000 | Nagasaka et al. |

* cited by examiner

Primary Examiner—Marguerite McMahon
(74) Attorney, Agent, or Firm—Blodgett & Blodgett, P.C.

(57) ABSTRACT

A modified air intake mechanism for an internal combustion engine. The air intake mechanism includes an air passageway that contains a fixed vane located in a plane that is parallel to the air flow within the passageway. More specifically, the vane is stationary and is located in the air horn or the air intake passageway of the cylinder head.

14 Claims, 4 Drawing Sheets

AIR INTAKE FOR INTERNAL COMBUSTION ENGINE

CROSS-REFERENCE TO RELATED APPLICATIONS

This application claims the benefit under 35 U.S.C. § 119(e) of prior U.S. Provisional Application No. 60/177,771 filed Jan. 24, 2000; which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to the air intake features of an internal combustion engine. For most internal combustion engines, ambient air is mixed with a vaporized fuel. The air fuel mixture is introduced into the working cylinder portion of the engine. Power can be increased by increasing air flow into the cylinder. One way to increase air flow to an internal combustion engine is to add a "velocity stack" or "air horn" to a carburetor or fuel injector. A "velocity stack" is a generally cone-shaped device that is open to the outside and directs airflow to the air-fuel system. These devices are more commonly used on engines that are intended for extra power including automobile, motorcycle or power boat engines. The velocity stack has a relatively large inlet opening and a relatively small outlet opening. Generally, when a velocity stack is used on an engine, an air filter is not used.

Many engine designs include an adjustable vane in the air horn, air intake port of the cylinder head or both. The vane functions as a valve to control the air flow to accommodate variations in power needs. In one known engine design, the vane in the air intake passageway of the cylinder head is fixed within the passageway. The vane gradually twists so that the cross-section area of the air intake passageway gradually narrows toward the inlet port of the cylinder. Therefore, the primary effect of the vane is to direct the air flow.

Many of the prior art air intake devices that employ vanes restrict air flow in the intake port in such a way that the air flow is biased toward one side of the valve opening and it's velocity is maintained. In each case, a circular air flow is created within the combustion cylinder around the cylinder axis. This increases mixing of the charge in the cylinder for best fuel efficiency. Therefore, the prior art air intake devices which employ a vane increase air turbulence to increase fuel efficiency not power. These and other difficulties experienced with the prior art air horn and cylinder head designs have been obviated by the present invention.

A principle object of the present invention is to provide an air intake system for an internal combustion engine that will produce an increased air flow to the engine and a resulting increase in horsepower.

A further object of the invention is the provision of an air intake system for an internal combustion engine that includes a modification in the path of the air flow leading to the engine.

Another object of the invention is the provision of a vane structure in either the air passageway of the air horn or cylinder head for reducing turbulence and increasing air flow to the cylinder.

BRIEF SUMMARY OF THE INVENTION

In general, the invention consists of a modified air intake mechanism for an internal combustion engine. The air intake mechanism includes an air passageway that contains a fixed vane located in a plane that is parallel to the air flow within the passageway. More specifically, the vane is stationary and is located in the air horn, an air intake passageway of an air horn or the cylinder head.

BRIEF DESCRIPTION OF THE DRAWINGS

The character of the invention, however, may be best understood by reference to the accompanying drawings, in which.

DETAILED DESCRIPTION OF THE INVENTION

Figure 1:
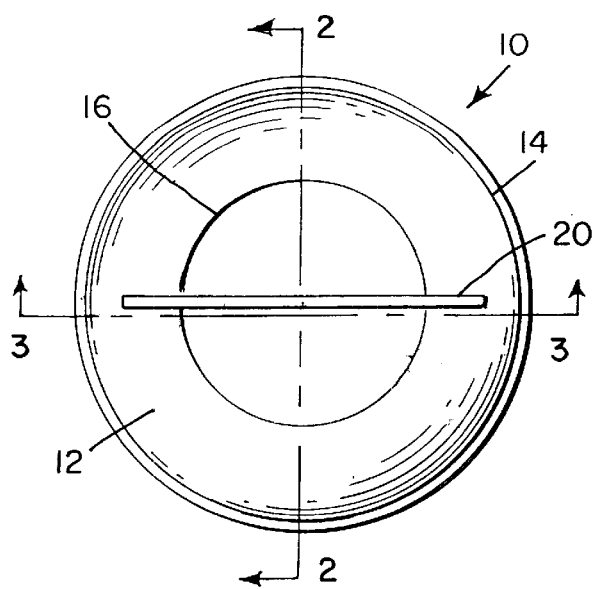
FIG. 1 is a top plan view of an air horn which forms part of the air intake of a motorcycle engine and embodying the principles of the present invention.
Figure 2:
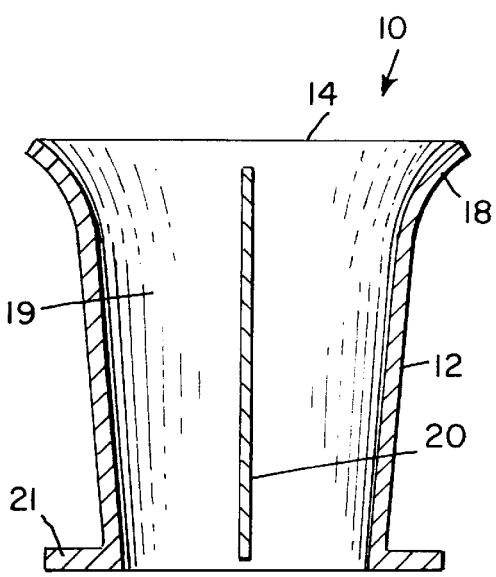
FIG. 2 is a vertical cross-sectional view taken along line II—II of FIG. 1 and looking in the direction of the arrows.
Figure 3:
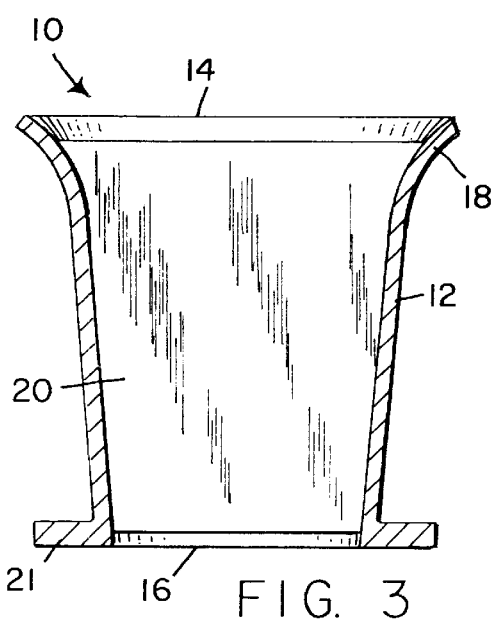
FIG. 3 is a vertical cross-sectional view taken along line III—III of FIG. 1 and looking in the direction of the arrows.

Referring to FIGS. 1–3, there is shown an "air horn" or "velocity stack", generally indicated by the reference numeral 10, for use on some types of engines. Air horn 10 has a frusto conical wall 12 that has an inlet opening 14 at one end of the air horn and an outlet opening 16 at the opposite end of the air horn. Wall 12 of the air horn flares outwardly as at 18 at the inlet opening 14. The wall 12 defines an internal air passageway 19 that extends from the inlet opening 14 to the outlet opening 16. A mounting flange 21 is located adjacent the outlet opening 16. A vane 20 is located in the passageway 19 and is located in a plane that is parallel to the air flow path. The vane 20 spans the passageway 19 in a lateral direction and extends nearly the entire length of the passageway 19 in the longitudinal direction. Air horn 10 is located on the outside of the motorcycle and is operatively connected to the carburetor of the motorcycle. Under circumstances other than for an internal combustion engine, the presence of a vane in an air passageway would be detrimental to air flow. The vane reduces the cross-sectional area of the passageway and creates a drag to air flow. This is confirmed by bench tests which show that air flow through the air horn is reduced when a vane is added to the chamber of the air horn. However, tests also showed that when the air horn is operatively connected to an internal combustion engine, air flow and horsepower are both increased. It is believed that an internal combustion engine causes a vortex to develop in the air inlet passageways leading from the outside to the cylinders of the engine. It is also believed that the presence of the vane within the air horn prevents a vortex from forming in the passageway of the air horn. Although the vane also impedes air flow, the disruption of, or prevention of a vortex results in a net gain in air flow to the engine. Best results for increased air flow and the resulting increase in horsepower have been achieved by having the vane extend substantially along the entire length of the air horn. Substantial beneficial results have also been obtained with a vane having a length which is at least equal to the smallest diameter of the air horn.

Figure 4:
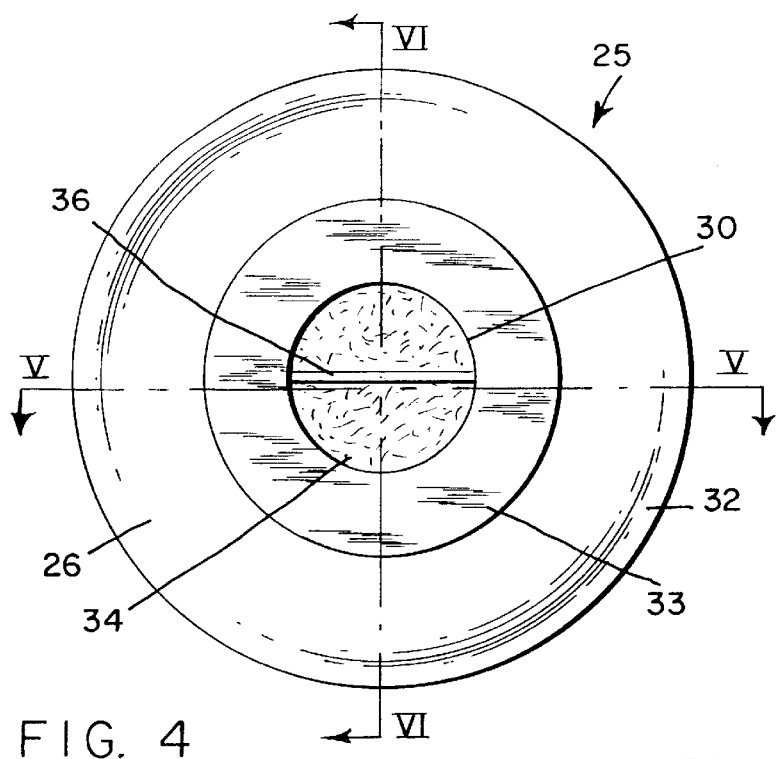
FIG. 4 is a bottom plan view of a modified velocity stack for an internal combustion engine and embodying the principles of the present invention.
Figure 5:
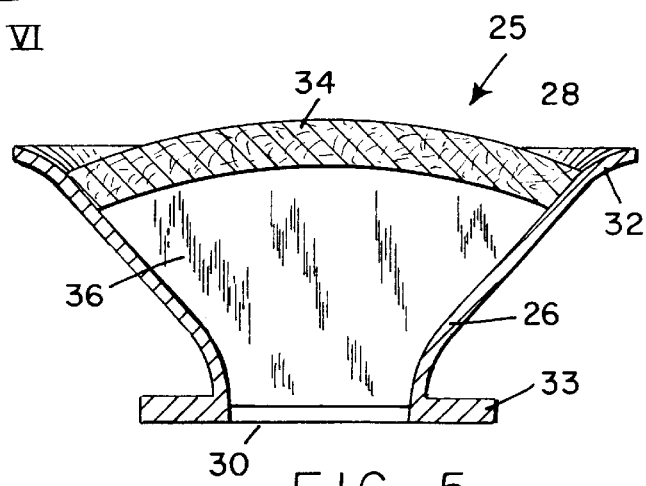
FIG. 5 is a vertical cross-sectional view taken along line 5—5 of FIG. 4 and looking in the direction of the arrows.
Figure 6:
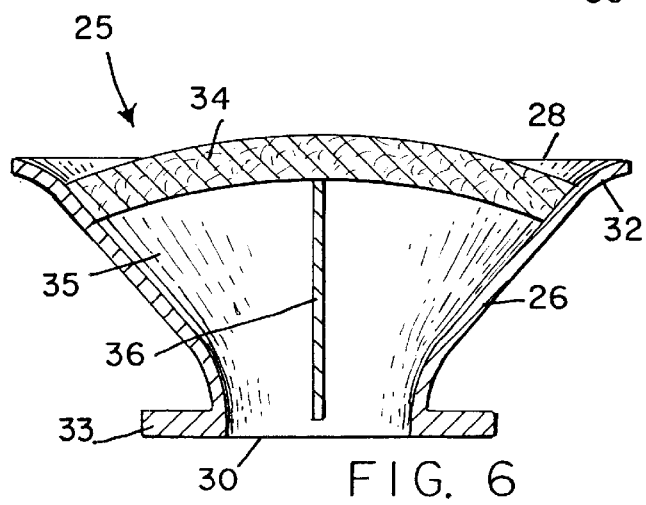
FIG. 6 is a vertical cross-sectional view taken along line 6—6 of FIG. 4 and looking in the direction of the arrows.

Referring to FIGS. 4–6, there is shown a second type of air horn of a type commonly used on motorcycles and has been modified in accordance to the present invention. The air horn shown in FIGS. 4–6 is generally indicated by the reference numeral 25 and has a frusto conical side wall 26 that extends from an inlet opening 28 to an outlet opening 30. The wall 26 flares outwardly at 32 at the inlet opening 28. A mounting flange 33 is located adjacent the outlet opening 30. An air filter 34 is located at the inlet opening 28. A vane 36 is located in the passageway 35. A side wall 26 defines a passageway 35. The vane 36 extends transversely across the entire width of the passageway 35 as shown in FIG. 5 and extends longitudinally from the filter 34 to the outlet opening 30. It is preferred that the vane 36 extends substantially the entire length of the air horn 25. However, a substantial increase in air flow and a resulting increase in horsepower are obtained from a longitudinal vane length which is at least equal to the smallest diameter of the air horn, i. e. diameter of the outlet opening 30.

Figure 7:
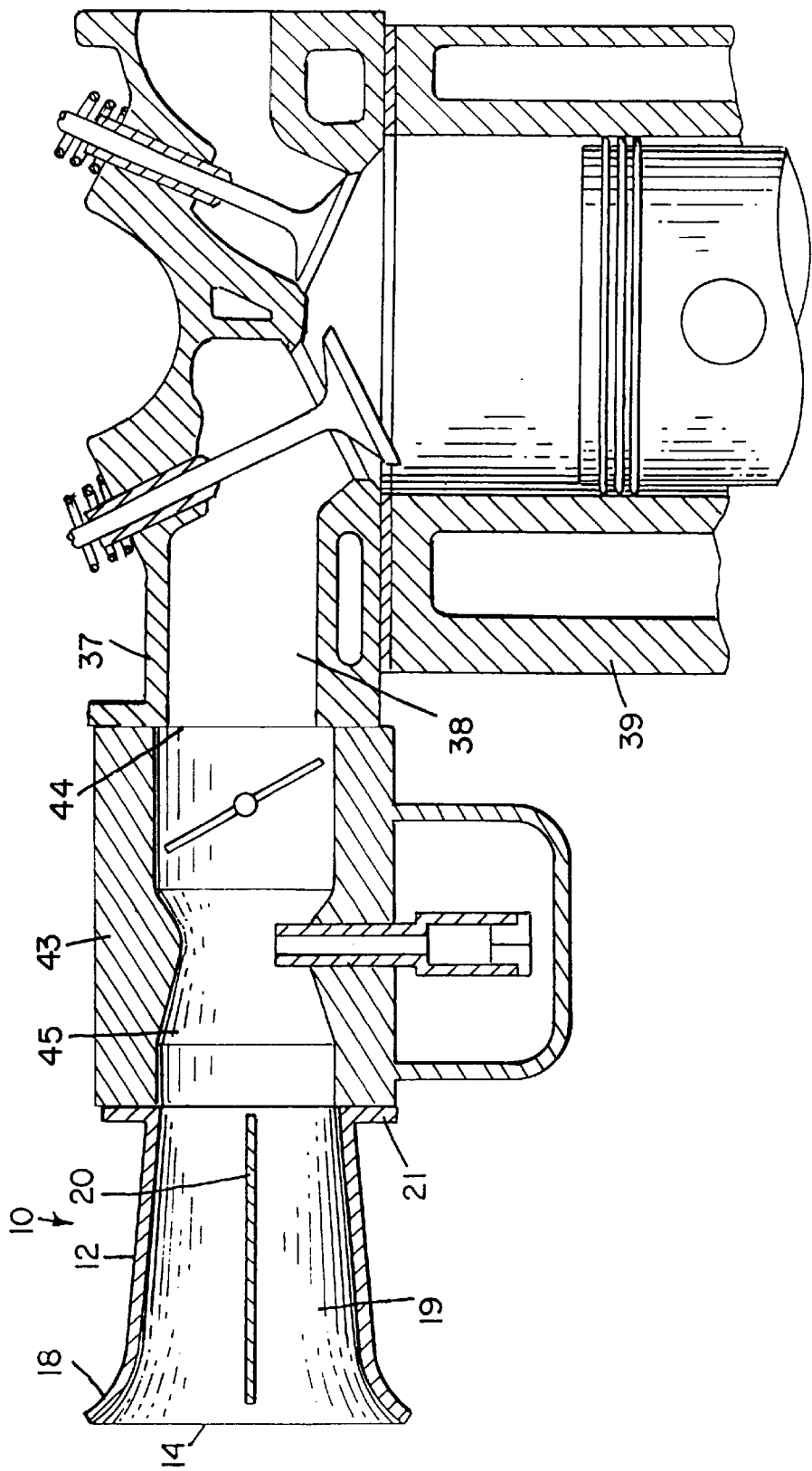
FIG. 7 is a cross-sectional view of the cylinder head of an internal combustion engine equipped with an air horn of the present invention.

FIG. 7 shows the air horn 10 of the present invention applied to the cylinder head of an internal combustion engine. The cylinder head is indicated by the reference numeral 37 and includes an air intake passageway 38. The cylinder head 37 is shown affixed to the combustion end of a cylinder 39. A carburetor 43 is located between the air horn 10 and the cylinder head 27. The carburetor 43 includes a passageway 45 which connects the passageway 19 of the air horn 10 to the air intake port 38.

Figure 8:
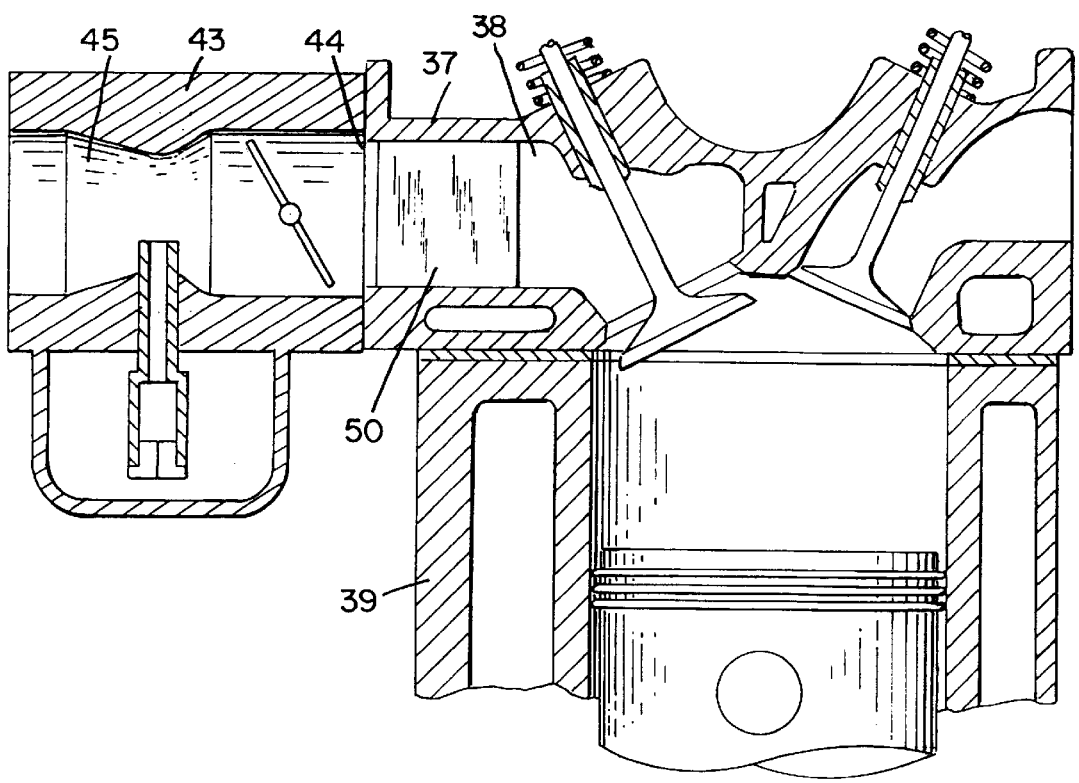
FIG. 8 is a cross-sectional view similar to FIG. 7 without an air horn and having a vane in the air intake passageway of the cylinder head.

Referring to FIG. 8, there is shown a modification of the invention wherein the air horn is not utilized. A vane 50 similar to vane 20 of the air horn is located within the air 30 intake passageway 38. The vane 20 spans the entire width of the air intake passageway 38 and extends longitudinally from the opening 44 of the air intake passageway 38. The longitudinal length of the vane 50, is at least equal to the diameter of the inlet opening 44. Tests have shown that the inclusion of a vane in the passageway 38, such as that shown in FIG. 8 or passageway 19 of the air horn as shown in FIG. 7, results in increased air flow to the cylinder of the internal combustion engine, with a resulting increase in horsepower for a wide range of rpm of the engine. Test results appear to indicate that, without a vane, a vortex is created in the air flow to the internal combustion engine. Test results also appear to show that the presence of a vane in the path of the air flow between the cylinder of the engine and the opening to ambient air eliminates or disrupts the vortex sufficiently to increase the air flow to the engine with a resulting increase in horsepower.

What is claimed is:

1. An air intake housing for an internal combustion engine, said housing having a first end and a second end opposite said first end, said housing comprising:
   (a) a side wall having an annular inner surface which defines an air intake passageway, an outer opening to said passageway at said first end and an inner opening at said second end, said air intake passageway having a central longitudinal axis;
   (b) a planar vane fixed to said inner surface and extending along said longitudinal axis, said vane spanning said air intake passageway.

2. The air intake housing as recited in claim 1, wherein said air intake passageway is frusto conical and tapers inwardly from said first end to said second end.

3. The air intake housing as recited in claim 2, wherein the inner surface at said first end is curved longitudinally and flares outwardly toward said outer opening.

4. The air intake housing as recited in claim 1, wherein the inner surface at said first end is curved longitudinally and flares outwardly toward said outer opening.

5. The air intake housing as recited in claim 1, further comprising an air filter at said outer opening.

6. The air intake housing as recited in claim 1, wherein said air intake passageway is an outer air intake passageway and said housing is an air adapted to be mounted to an internal combustion engine having a fuel metering device connected to a cylinder head, said fuel metering device containing an inner air intake passageway and an inlet opening to said inner air intake passageway, said air horn being adapted to be mounted to the fuel metering device cylinder head so that the outlet opening of said outer air intake passageway abuts the inlet opening of said inner air intake passageway.

7. The air intake housing as recited in claim 1, wherein said housing is part of a cylinder head at one end of a cylinder which forms part of said internal combustion engine and said air intake passageway is within said cylinder head.

8. The air intake housing as recited in claim 1, wherein said vane extends substantially the entire longitudinal length of said air intake passageway.

9. An internal combustion engine comprising:
   (a) a cylinder head containing a cylinder having a combustion end and a power end and an air intake port at said combustion end;
   (b) a fuel metering device connected to said cylinder head, said fuel metering device having an inlet opening and an inner air intake passageway operatively connected to said air intake port;
   (c) an air horn having an annular inner surface which defines an outer air intake passageway, an outer opening to said outer air intake passageway and an inner opening which abuts the inlet opening of said fuel metering device, said outer intake passageway having a central longitudinal axis; and
   (d) a planar vane fixed to said inner surface and extending along said longitudinal axis, said vane spanning said outer air intake passageway.

10. The internal combustion engine as recited in claim 9, wherein said outer air intake passageway is frusto conical and tapers inwardly toward said air cylinder head.

11. The internal combustion engine as recited in claim 10, wherein said outer air intake passageway is defined by an inner surface which is curved longitudinally adjacent said outer opening and flares outwardly toward said outer opening.

12. The internal combustion engine as recited in claim 9, wherein said outer air intake passageway is defined by an inner surface which is curved longitudinally adjacent said outer opening and flares outwardly toward said outer opening.

13. The internal combustion engine as recited in claim 9, further comprising a carburetor between said air horn and said cylinder head.

14. The internal combustion engine as recited in claim 9, wherein said vane extends substantially the entire longitudinal length of said outer air intake passageway.

* * * * *